Jan. 26, 1960 W. T. KELLY ET AL 2,922,484
GEOPHYSICAL EXPLORATION
Filed June 25, 1956
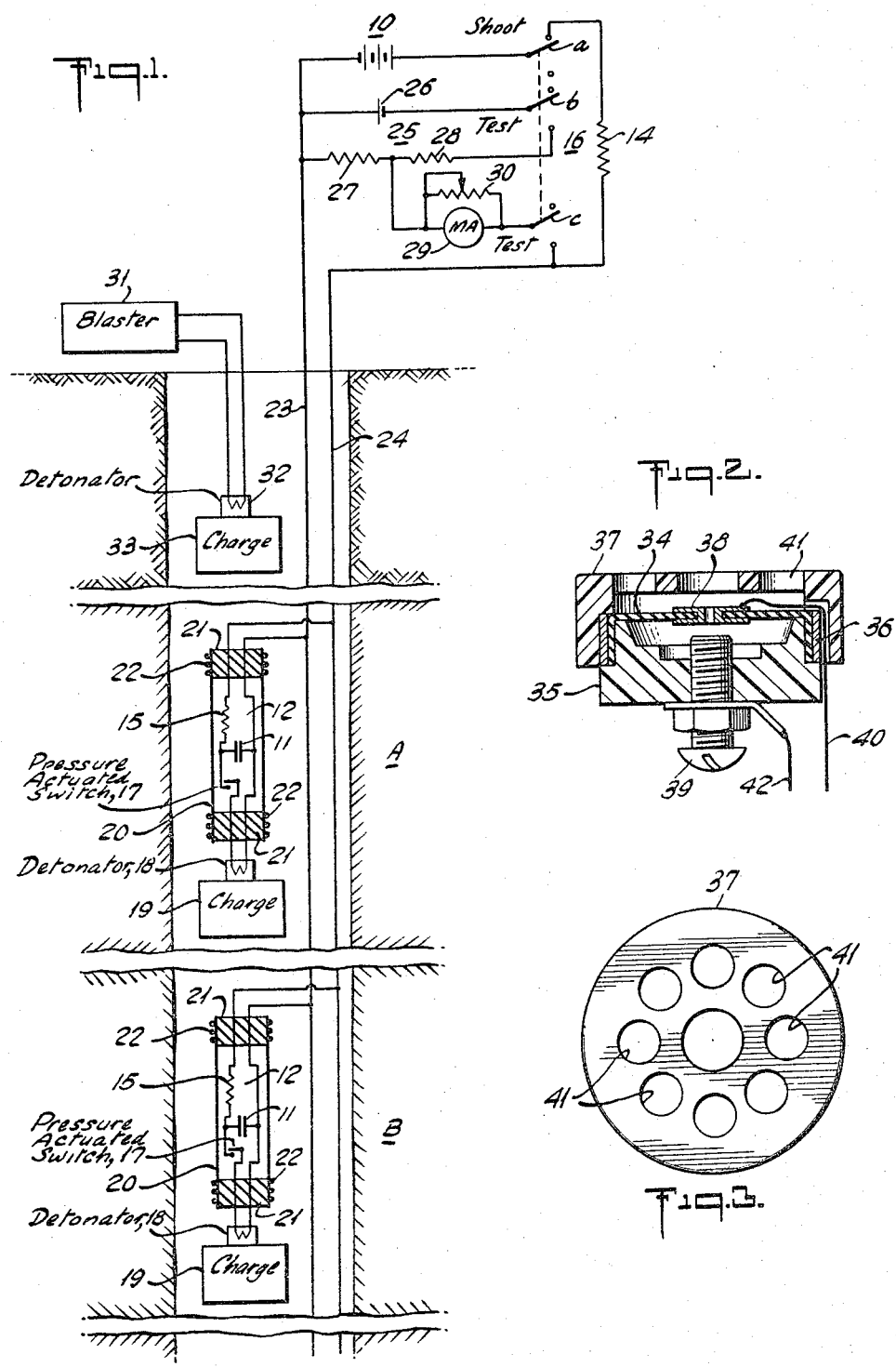

United States Patent Office 2,922,484
Patented Jan. 26, 1960

2,922,484

GEOPHYSICAL EXPLORATION

William T. Kelly and Roy J. Clements, Bellaire, Tex., assignors to Texaco Inc., a corporation of Delaware Application June 25, 1956, Serial No. 593,418

6 Claims. (Cl. 181—.5)

This invention relates to geophysical exploration and more particularly to an improved method of and apparatus for geophysical exploration employing seismic waves.

In seismic reflection surveying, the depths of underlying geophysical formations are determined by measuring the time intervals elapsed between the generation and reception of seismic waves which have been artificially created such as by exploding a charge of explosive above, on or below the surface of the earth. In seismic reflection surveying as it is usually practiced, a charge of explosive is set off at a point beneath the earth's surface known as a shot point. The shot point is most frequently located beneath the low velocity or weathered layer which is an unconsolidated and aerated formation which exhibits seismic wave velocities of less than 5,000 feet per second, frequently less than 2,000 feet per second. After the explosion of the charge, the seismic waves travel from the shot point to underlying strata where they are reflected back toward the earth's surface and then picked up by seismic wave detectors or geophones. Geophones or seismic detectors are devices which are provided with means for converting pressure waves or the mechanical vibrations created in the earth by the seismic waves into electric waves. The geophones used to detect the reflected seismic waves are arrayed in a suitable manner depending upon local conditions and the type of seismic information desired. The usual practice is to array the geophones in a straight line passing through or over the shot point and at or near the earth's surface. The geophones are spaced from each other and from the shot points usually at regular intervals. Although the explosion of the charge creates seismic waves having a wide range of frequencies, filtering action of the earth and electrical networks is employed to eliminate certain unwanted frequencies from the seismic record. The high frequency components of the seismic wave are readily absorbed by the geological formations and therefore do not reach the detectors. Low frequency components of the detected seismic wave, i.e., 20 cycles or less, which are often associated with the so-called clutter or surface traveling waves and random noise not associated with the desired reflected seismic wave originating from the shot point are usually eliminated by the use of appropriate filter circuits in one or more amplifiers which are connected to the output of geophones.

By recording the output waves from the amplifiers and observing the resulting record the existence, location and attitude of the underlying reflecting formations can be determined.

Notwithstanding the filtering action, the detection and identification of the reflected seismic waves is difficult in the presence of noise picked up by the geophones. Additional factors complicating the identification of the detected seismic waves and the interpretation of the seismic records are the influences exhibited by the varying physical characteristics of the underlying geological formations upon the seismic waves. Furthermore, the strength of the reflected seismic waves depends upon the strength of the explosive charge and upon the acoustical contrast between the adjacent underlying formations.

Techniques have been proposed for increasing the strength of a reflected seismic wave so that it may more readily be detected and identified on the seismic record. Patents relating to this subject matter include U.S. Patents 1,998,412, 2,556,299, 2,601,522, and 2,609,885. In general, it has been proposed to create a strong, substantially unidirectional downwardly directed seismic wave, which when reflected by the underlying geological formation and detected by the geophones will be of sufficient strength to be readily distinguished from noise on the seismic record. In one method of producing a strong seismic wave, it has been proposed to explode downwardly in a shot hole a continuous length, generally in spiral form, of explosive at a downward velocity equal to the seismic velocity in the formation surrounding the borehole so that as the seismic wave propagates downwardly its strength is increased. This method requires the use of a specially manufactured explosive which is cumbersome and expensive. It has also been proposed to detonate a plurality of spaced explosive charges within the borehole so as to produce a reinforced seismic wave traveling in a given direction. A method of seismic exploration in which a plurality of spaced explosive charges are employed to produce a reinforced seismic wave is described in detail in a copending patent application having Serial No. 432,971, filed May 28, 1954, by Oswald A. Itria and Burton D. Lee.

This invention particularly relates to a seismic exploration operation wherein an explosive charge positioned within a borehole is automatically exploded at a predetermined instant of time by a seismic or pressure wave to produce a reinforced seismic wave moving in a desired direction. The practice of this invention is particularly applicable to a seismic sequential shooting system wherein a plurality of vertically spaced explosive charges are positioned within the borehole and progressively detonated so as to create a single reinforced seismic wave moving in a desired direction.

Accordingly, it is an object of this invention to provide an improved method of seismic exploration.

It is another object of this invention to provide an improved method of seismic exploration wherein a plurality of spaced explosive charges within a shot hole are automatically detonated to produce a reinforced seismic wave.

It is a further object of this invention to provide an improved method of seismic exploration wherein a plurality of vertically spaced explosive charges are progressively and automatically detonated at a velocity equal to the seismic velocity in the formation traversed by the seismic waves to produce a reinforced seismic wave.

Still another object of this invention is to provide an improved method of seismic exploration wherein a plurality of vertically spaced explosive charges is progressively and automatically detonated by means of pressure-actuated switches at a velocity equal to the formation seismic velocity to produce a reinforced seismic wave.

It is a still further object of this invention to provide a pressure-actuated switch which is responsive to seismic pressure waves but not responsive to static well pressure.

An additional object of this invention is to provide a pressure-actuated switch which is of a simple construction and inexpensive and, therefore, readily expendable.

In order that the invention may be more clearly understood and readily carried into effect, it will now be described more fully with reference to the accompanying drawing in which:

Fig. 1 shows diagrammatically a vertical section of the earth through a borehole in which is disposed a sequential shooting system in accordance with the teachings of the present invention;

Fig. 2 shows a cross section of a pressure-actuated switch which may be used in the system of the invention; and Fig. 3 illustrates the perforations in the protective cap of the pressure-actuated switch shown in Fig. 2.

Referring in more detail to Fig. 1, there is shown a sequential shooting system for seismic surveying in which a battery 10 charges a capacitor 11 of a first firing circuit 12 of charge assembly A, located in a borehole 13, through common resistor 14 and resistor 15 of firing circuit 12 when switch $a$ of switch assembly 16 is in the shoot or closed position. A pressure-actuated switch 17 is connected in series with an electrically responsive ignition fuse of electric detonator 18 across capacitor 11. The electric detonator 18 is imbedded in explosive charge 19. Capacitor 11, resistor 15 and switch 17 may be inserted into a flexible rubber tube 20 provided with a rubber stopper or plug 21 at each end thereof to isolate these electric elements from the borehole or well fluids. A wire 22 may be wrapped around the outside of the rubber tube 20 at each end thereof to provide a tight seal between the tube 20 and the stoppers 21. Other charge assemblies, for example charge assembly B, shown in Fig. 1 which has like numerals for similar parts shown in charge assembly A, may be located at points in the borehole 13 remote from the location of charge assembly A for firing another explosive charge in a manner similar to that described with reference to the detonation of the charge of charge assembly A. The spacing between the charges 19 may be any distance limited primarily by the sensitivity of the pressure-actuated switches to the seismic waves, a preferred distance between charges in a sequential shooting system employing the pressure-actuated switches in accordance with the invention being 10 to 15 feet. Each of the assemblies may be connected to a pair of conductor wires 23, 24 having strength sufficient to support in the borehole 13 all the charge assemblies required for a given seismic operation. Alternatively, each charge assembly may be connected by a separate pair of wires each pair leading to the batteries located at the surface of the earth.

The sequential shooting system shown in Fig. 1 includes a test circuit 25 connected at the earth's surface to wires 23 and 24. This test circuit 25 includes battery 26, voltage dividing resistors 27 and 28 connected through switch $b$ of switch assembly 16 across battery 26. A milliameter 29 having a variable shunt resistor 30 is connected from the junction point of resistors 27 and 28 through switch $c$ of switch assembly 16 to wire 24, the end of resistor 27 remote from the junction point being connected to wire 23. Also included in the system illustrated in Fig. 1 is a conventional blaster 31 connected in a conventional manner to a detonator 32 of an explosive charge 33 for creating a first seismic wave in the borehole 13.

In the operation of the sequential shooting system, after each of the charge assemblies and explosive charge 33 are lowered to desired depths in the borehole 13 test circuit 25 is placed in its operative condition by closing switches $b$ and $c$ of switch assembly 16 to test for defective pressure-activated switches which may be prematurely in a closed position or for short-circuit conditions. Test circuit 25 applies a low direct current voltage between wires 23 and 24 which is of insufficient strength to detonate any of the detonators 18 but which is of sufficient strength to indicate the presence of a defective pressure-actuated switch or a short circuit condition in the borehole 13 before applying a higher voltage which is capable of firing the explosive charges 19. If a short circuit condition does not exist and if each of the switches 17 are in the open or normal position, which is indicated by a zero current reading on milliameter 29, switches $b$ and $c$ of the switch assembly 16 now may be opened and switch $a$ closed. By closing switch $a$ the switch assembly 16 is placed in the shoot position to apply to each of the capacitors 11 of the charge assemblies a voltage which will supply each of the capacitors 11 with energy sufficient to detonate its associated detonator 18 when its associated pressure-actuated switch 17 is closed. After the required energy has been stored in each of the capacitors 11, by normal blasting procedure blaster 31 is operated to detonate detonator 32 which fires explosive charge 33 to create a first seismic wave in the borehole 13. When the seismic wave reaches the pressure-actuated switch 17 of charge assembly A the pressure from the seismic wave will cause switch 17 to close, the energy stored in capacitor 11 will discharge through the electric detonator 18 to detonate charge 19 of that assembly thus producing a second seismic wave which when combined with the first seismic wave produces a reinforced seismic wave moving in a downward direction in borehole 13. When the reinforced seismic wave reaches the pressure-actuated switch 17 of charge assembly B the switch will be actuated to fire the charge 19 of that assembly to produce a third seismic wave which when combined with the reinforced seismic wave produces a stronger reinforced seismic wave moving down the borehole 13. Additional charge assemblies, for example, one to eight, may be provided which will continue to strengthen the seismic wave as it moves down the borehole 13.

Consequently, it can be seen that the pressure-actuated switches 17 provide a seismic sequential shooting system in which a plurality of vertically spaced charges can be fired in exact velocity conformity to the velocity of energy traveling along the borehole to produce a reinforced seismic wave without regard to the relative positions of the charges 19. Furthermore, the reinforced seismic wave will be produced without regard to whether or not the wires 23 and 24 have been cut by firing the top charges.

In the system the battery 10 may have a direct current voltage of about 135 volts. The common resistor 14 may have a value of resistance which is sufficient to protect the battery 10 from damage in the event of a short circuit across wires 23 and 24 when switch $a$ of switch assembly 16 is in the closed or shoot position. The resistors 15 of the firing circuits 12 are provided to prevent the charge on the condensers 11 from leaking off in the event that the charging wires 23 and 24 become short circuited as a result of firing a preceding charge.

Fig. 2 illustrates a cross section of a type of pressure-actuated switch which may be used for switches 17 of the firing circuits 12. This switch includes a yieldable member, for example a rubber diaphragm 34, stretched over a nonconductive cup-shaped body member 35 providing a rigid-walled chamber and held in position by means of a metallic retaining ring 36. A protective cap or cover 37 having perforations or openings 41 and which may be made of Bakelite or similar plastic material is held to the retaining ring 36 by means of a tight or friction fit. A grommet 38 disposed in the center of the rubber diaphragm 34 is adapted to provide electrical connection with an adjustable metal screw 39, which is supported by body member 35, when the grommet 38 is in contact with screw 39. The grommet 38 has an opening which is of sufficient area to provide a throttle opening or a capillary leak to the chamber for freely transmitting static well pressures to or from the chamber when the charge assembly is being lowered or raised in the well but which area is small enough to be ineffective in transmitting rapid pressure changes therethrough to the chamber. Thus the grommet 38 provides a capillary leak which equalizes static well pressures on the opposite sides of the rubber diaphragm 34 but which does not equalize the pressure on the opposite sides of diaphragm 34 when a seismic wave strikes the diaphragm 34. Consequently, the diaphragm 34 is insensitive to the static well pressures but is responsive to seismic waves. The pressure-activated switches may be provided with leads 40 and 42 which are connected to the grommet 38 and screw 39 respectively. The sensitivity of the pressure-actuated switches may be adjusted by adjusting the tension of the diaphragm 34. A plan view of protective cap or cover 37 is illustrated in Fig. 3. The cover 37 has perforations 41 having sufficiently large areas to readily pass the seismic pressure wave to the diaphragm 34.

In order to provide accurate sequential timing for firing the separately spaced explosive charges 19, due to the fact that there may be a delay in operation of the pressure-actuated switches, each switch may be spaced from its associated charge in a direction toward the oncoming pressure wave by a distance of one to two feet and even more in certain cases, depending upon the speed of operation of the switch and on the seismic velocity. Furthermore, it should be noted that it is possible for the seismic velocity in the borehole fluid or tamping material to be greater than the seismic velocity in the formation surrounding the borehole and thus the instants of firing the charges could be unfavorable. These instances can be properly timed by (a) locating the pressure-actuated switch at a certain point from its associated charge in a direction away from the oncoming pressure wave and/or altering the fluid or tamping material in the borehole substantially between the first and last explosive charges so that the seismic velocity in the borehole has a desired value. Either one of these operations or a combination thereof would provide the proper time sequence of firing the several discrete and separate charges in order to obtain the optimum strength of seismic energy in a given direction.

Although this sequential shooting system has been illustrated and described as a system which produces a reinforced seismic wave initially moving in the downward direction in a borehole, it should be understood that the system can be operated to produce a reinforced seismic wave initially moving in an upward direction by firing the first explosive charge 33 at a point below the lowest charge assembly of the system and by properly positioning each pressure-actuated switch with respect to its associated charge. Furthermore, ghost waves, i.e., seismic waves moving in the opposite direction from that of the reinforced seismic waves may be substantially eliminated or at least minimized by placing the separate charges at points in the borehole which when fired will produce ghost waves tending to cancel previously created ghost waves. Ghost wave cancellation is described in more detail in copending applications having Serial No. 424,200, filed April 19, 1954, by Oswald A. Itria and Burton D. Lee; Serial No. 444,591, filed July 20, 1954, by Oswald A. Itria; and Serial No. 446,625, filed July 29, 1954, by Burton D. Lee.

An important feature of this seismic system is that although each charge assembly requires a reservoir of electric energy to fire its charge, the charge assemblies can be lowered into the borehole without the danger of simultaneously lowering the reservoirs of energy with the charges. A reservoir of energy is provided for each charge assembly only after the charges are lowered to the desired depths. To eliminate the hazard of accidental discharge by an induced voltage in the charging leads 23, 24 when working in the vicinity of a source of magnetic flux lines, say, electric power lines, a short circuit connection can be made between wires 23 and 24 at the top of the borehole and, additionally, the terminals of each charge assembly may be provided with a short circuit which can be removed after the assembly has been connected to the wires 23 and 24 or as the assembly is being lowered into the borehole. Furthermore, where necessary, precaution may be taken to shield the lengths of wires disposed at the earth's surface from the flux lines.

Obviously many modifications and variations of the invention as hereinabove set forth may be made without departing from the spirit and scope thereof and therefore only such limitations should be imposed as are indicated in the appended claims.

We claim:

1. A seismic exploration system wherein a seismic wave passes through a borehole comprising a charge of explosive provided with an electrically responsive ignition fuse, a capacitor, means for charging said capacitor and switching means responsive to said seismic wave for connecting said fuse to said capacitor to discharge said capacitor through said fuse.

2. A seismic exploration system wherein a seismic wave passes through a borehole comprising a charge of explosive provided with an electrically responsive ignition fuse, a capacitor, means for charging said capacitor from a remote point, and a pressure-actuated switch responsive to said seismic wave for discharging said capacitor through said fuse to detonate said charge.

3. A seismic exploration system wherein a seismic wave passes through a borehole comprising a charge of explosive provided with an electrically responsive ignition fuse, a capacitor, means for charging said capacitor from a remote point, a pressure-actuated switch responsive to said seismic wave for discharging said capacitor through said fuse to detonate said charge and means for providing a liquid tight seal about said capacitor and said pressure-actuated switch.

4. A system as set forth in claim 3 wherein said sealing means comprises a yieldable tube and two stoppers, each of said stoppers closing different ends of said tube.

5. A sequential shooting system for seismic surveying wherein a seismic wave passes through a borehole comprising a plurality of explosive charges disposed in spaced apart positions along the axis of said borehole, each of said charges being provided with an electrically responsive ignition fuse, a plurality of capacitors corresponding to said ignition fuses, means for charging said capacitors and switching means responsive to said seismic wave for sequentially discharging said capacitors through their respective ignition fuses to sequentially detonate said charges.

6. A sequential shooting system for seismic surveying wherein a seismic wave passes through a borehole comprising a plurality of explosive charges disposed in spaced apart positions along the axis of a borehole, each of said charges being provided with an electrically responsive ignition fuse, a plurality of capacitors corresponding to said ignition fuses, means for charging said capacitors from a remote point and a plurality of pressure-actuated switches, each of said switches being disposed to discharge one of said capacitors through its respective fuse in response to said seismic wave to sequentially detonate said charges.

References Cited in the file of this patent

UNITED STATES PATENTS

| | | |
|---|---|---|
| 1,311,785 | Wildrick | July 29, 1919 |
| 1,998,412 | Prescott | Apr. 16, 1935 |
| 2,396,699 | Hayes et al. | Mar. 19, 1946 |
| 2,556,299 | Scott | June 12, 1951 |
| 2,644,049 | Walters | June 30, 1953 |
| 2,685,251 | Davis et al. | Aug. 3, 1954 |
| 2,706,011 | Bayhi | Apr. 12, 1955 |